United States Patent [19]
Cai et al.

[11] Patent Number: 5,324,924
[45] Date of Patent: Jun. 28, 1994

[54] BAR CODE DECODER WITH CHANGEABLE WORKING RANGES

[75] Inventors: Joseph Cai, Sayville; Glenn S. Spitz, Far Rockaway; Edward Barkan, Miller Place; Robert Stein, Amityville; Robert Sanders, Shoreham, all of N.Y.

[73] Assignee: Symbol Technologies, Inc., Bohemia, N.Y.

[21] Appl. No.: 880,874

[22] Filed: May 11, 1992

[51] Int. Cl.$^5$ ............................................. G06K 7/10
[52] U.S. Cl. ................................. 235/463; 235/462; 235/472
[58] Field of Search ........................ 235/463, 472, 462

[56] References Cited

U.S. PATENT DOCUMENTS

| | | | |
|---|---|---|---|
| 4,387,297 | 6/1983 | Swartz et al. | 235/462 |
| 4,408,344 | 10/1983 | McWaters et al. | 235/440 |
| 4,411,016 | 10/1983 | Wakeland | 235/440 |
| 4,713,785 | 12/1987 | Antonelli et al. | 235/463 |
| 4,740,675 | 4/1988 | Brosnan et al. | 235/462 |
| 4,749,879 | 6/1988 | Peterson et al. | 235/462 |
| 4,760,248 | 7/1988 | Swartz et al. | 235/472 |
| 4,798,943 | 1/1989 | Cherry | 235/463 |
| 4,808,804 | 2/1989 | Krichever et al. | 235/462 |
| 4,825,058 | 4/1989 | Poland | 235/472 |
| 4,861,972 | 8/1989 | Elliott et al. | 235/462 |
| 5,036,183 | 7/1991 | Ouchi et al. | 235/462 |
| 5,180,904 | 1/1993 | Shepard et al. | 235/472 |

FOREIGN PATENT DOCUMENTS 60-112184  6/1985  Japan ..................... 235/463

Primary Examiner—Donald Hajec
Assistant Examiner—Adrian Young

[57] ABSTRACT

An arrangement for decoding a bar code symbol in which the data resulting from scanning a bar code symbol with a bar code scanner is evaluated to determine if the scanned bar code symbol is within the working range of the scanner. The data acquired by the bar code scanner is evaluated to determine if the detected widths of the bars and spaces of the scanned bar code symbol are too small, less than a threshold value, which indicates that the bar code symbol is too far and outside of the working range of the scanner. Moreover, the working range of the bar code scanner can be selectively changed by changing the threshold value, which can be easily implemented by having the bar code scanner scan a menu bar code which instructs the decoder to change the threshold value to a selected new value which may be pre-established for the particular operation. The arrangement preferably includes software to process the data acquired by the bar code scanner, and if the data indicates that the scanning distance to the bar code is too far, a flag is set in the software which prevents a new decode result from being recorded. However, the intermediate decode result is retained in memory to indicate that the bar code symbol is still in the scanner's field of view. A second evaluation validation to determine if the detected bar code symbol is valid may also be performed.

30 Claims, 2 Drawing Sheets

BAR CODE DECODER WITH CHANGEABLE WORKING RANGES

BACKGROUND OF THE INVENTION

1. Field of the Invention

The present invention relates generally to a method of bar code decoding and also a bar code decoder in which the data acquired by a bar code scanner is evaluated to determine if a scanned bar code symbol is within an acceptable working range of the bar code scanner. More particularly, the subject invention pertains to a method of bar code decoding and a bar code decoder as described in which the working range of the bar code scanner can be selectively changed. In the method and the bar code decoder of the subject invention, if the scanning distance is determined to be too far, a flag is set in software which prevents a new decode from being counted, but still keeps the intermediate decode result in memory to indicate that the bar code symbol is still in the scanner's field of view.

2. Discussion of the Prior Art

Prior art bar code scanners and decoders have generally employed a fixed working range, in some products typically from contact to seven or eight inches. Under some operating conditions, a bar code positioned at a critical distance from the scanner near the end of its working range, e.g., at seven or eight inches, can result in an erroneous decoding of the bar code or multiple different decodes of the same bar code, which is obviously not acceptable as it results in erroneous data entries.

SUMMARY OF THE INVENTION

Accordingly, it is a primary object of the present invention to provide a method of decoding a bar code symbol and also a bar code decoder in which the data resulting from scanning a bar code symbol is evaluated to determine if the scanned bar code symbol is within the working range of the bar code scanner.

An additional object of the subject invention is to provide a method of decoding a bar code symbol and also a bar code decoder in which the working range of the bar code scanner can be selectively changed.

A further object of the subject invention is the provision of a method of decoding a bar code symbol and also a bar code scanner as described which includes software to process the data acquired by the bar code scanner, and if the data indicates that the scanning distance to the bar code is too far, a flag is set in the software which prevents a new decode result from being recorded. However, the intermediate decode result is retained in memory to indicate that the bar code symbol is still in the scanner's field of view.

In accordance with the teachings herein, the present invention provides a method of decoding a bar code symbol and also a bar code decoder which operates by evaluating the data acquired by a bar code scanner to determine if the detected widths of the bars and spaces of the scanned bar code symbol are too small, which indicates that the bar code symbol is too far from and outside of the working range of the scanner. Generally, as a bar code symbol is moved further from the scanner, the detected time widths of the bars and spaces of the scanned bar code symbol will decrease, and conversely as the bar code symbol is moved closer to the scanner, the detected time widths of the bars and spaces of the scanned bar code symbol will increase. Accordingly, the detected time widths of the bars and spaces of the scanned bar code symbol can be compared with a threshold value to determine if the bar code symbol is within the working range of the bar code scanner. A second evaluation is also performed which is a check of the acquired data to determine if the detected bar code symbol is a valid bar code symbol, i.e., it has all of the characteristics of a valid bar code symbol, or if the decoded bar code symbol is an invalid symbol, i.e., it does not have all of the characteristics of a valid bar code symbol. The acquired data must pass both the first (bar code not too far) and the second (valid bar code symbol) evaluations before it is accepted as a bar code to be counted.

The arrangement preferably includes a memory such as a working buffer memory and a count down timer. The digital data representing the detected widths of the bars and spaces of the scanned bar code symbol are stored in the memory. After each successful scan, the count in the count down timer is initialized to zero. If the evaluation for a valid bar codes symbol indicates a valid symbol, the count of the count down timer is set to a given value T1, during which if a second decode result is obtained which is identical to the prior decode result stored in memory, the second decode result is disregarded. Moreover, if the evaluation for a valid bar code symbol indicates a valid symbol, the results of the evaluation to determine if the scanned bar code symbol is within the working range of the bar code scanner is checked, and if so, the scanned bar code symbol is accepted as a bar code symbol to be reported, and if not, another scanning operation is performed.

Moreover, the threshold value can be easily selectively changed by scanning a bar code menu bar code which indicates a particular value for the threshold value. If the evaluation for a valid bar code symbol indicates a valid symbol, the scanned bar code symbol is checked to determine if it is a menu bar code, and if so, the threshold value is changed to a new threshold value indicated by the menu bar code. Accordingly, the threshold value can be selected and easily changed in dependence upon the requirements of the particular bar code scanning application being addressed.

BRIEF DESCRIPTION OF THE DRAWINGS

The foregoing objects and advantages of the present invention for a bar code decoder with changeable working ranges may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
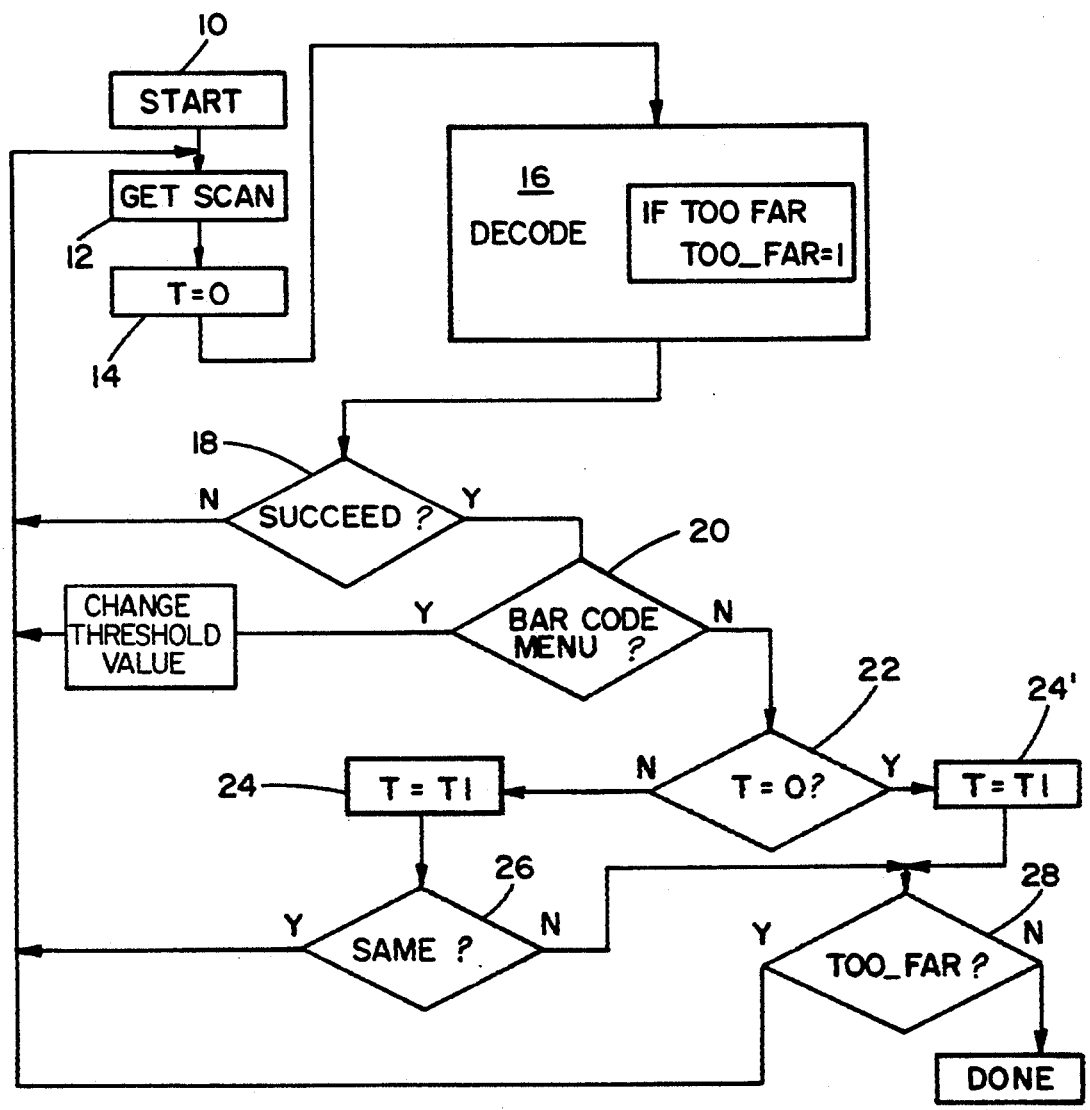
FIG. 1 illustrates a logic flow diagram of software implementing the principles of operation of the present invention for a method of decoding a bar code symbol and also a bar code decoder with changeable working ranges.

Referring to the drawings in detail, FIG. 1 illustrates a logic flow diagram of software implementing the principles of operation of the present invention for a method of decoding a bar code symbol and also a bar code decoder with changeable working ranges. Following a [start] 10 of operations, which is a standard initialization procedure, [get scan] 12 indicates that the bar code scanner reads one scan of a bar code and outputs to a working buffer memory the detected bar code data, which is a series of binary numbers representing the detected widths of the scanned bars and spaces. Next [set T=0] 14 indicates that the count T of a count down timer, which is preferably a timer implemented in software, is initialized to 0. After the first successful decode operation, the count T of the count down timer is always set to a constant value T1. If a second, exactly the same, decode result is obtained within the time period T1, the second decode result is not counted. By way of explanation, the time period T1 is a selected time period in which a second identical decode result is ignored as probably being the result of scanning the same bar code pattern twice (e.g., in a retail environment, each scanned item should be recorded and tallied only once).

Next [decode] 16 indicates that the bar code data in the buffer memory is decoded. This routine utilizes standard decode software but differs therefrom by additionally including a too-far check, which is a check of the detected widths of bars and spaces to determine if they are narrower than a preselected value char-len (stands for character length). If they are too narrow, which indicates that the bar code is too far from the scanner, then a flag too_far=1 is set in the software. By way of explanation, the decoder can approximately determine the distance to a scanned bar code by checking the detected time widths of the bars and spaces of the scanned bar code pattern as the detected time widths will decrease as the distance to the bar code pattern increases.

Accordingly, the outer limit of the bar code scanner can be set by setting a minimum detected width (char-len), and a detected width which is smaller than that minimum would result in a conclusion that the scanned bar code pattern is beyond the maximum accepted working range of the bar code scanner. Depending upon the requirements of the particular bar code scanning application being addressed, different values for char-len can be selected, which changes the working range of the scanner.

Next [succeed?] 18 indicates that the decode result is evaluated to determine whether it is a valid bar code symbol, i.e., the decoded bar code symbol has all of the characteristics of a valid bar code symbol (for instance, a detected bar code symbol might have a sequence of bar and space widths which does not conform to the methodology of acceptable bar code symbols, and so should be rejected). If not successful, indicating a valid bar code was not obtained, the software routine returns to [get scan] 12, to obtain another scan of bar code data. Otherwise, if successful, indicating a valid bar code symbol was obtained, the software routine proceeds to [bar code menu?] 20 which checks the decoded bar code symbol to determine if it is from a bar code menu. A bar code menu bar code is actually an instruction to the system, such as to set or change the value of char-len in memory, which sets or changes the working range in memory. If yes, the value of char-len in memory which is utilized by [decode] 16 is changed, and the software routine returns to [get scan] 12 to obtain another scan of bar code data. If not, the software routine proceeds to [T=0?] 22 which checks the count down timer T to determine whether or not it has elapsed.

After this check, whether the count T in the count down timer has elapsed or not, the count T in the count down timer is always reset to a constant value T1, by either routine [T=T1] 24 or 24'. As explained above, T1 is a selected time period for ignoring the same decode result. Accordingly, if the count T has not elapsed, the routine proceeds to [same?] 26, which indicates that the decode result is checked to determine whether or not it is exactly the same as the previous decode result. If the decode results are exactly the same, the new decode result is ignored, and the routine returns to [get scan] 12 to obtain another scan of bar code data. If the decode results are not the same, the software routine proceeds to [too-far?] 28. Also, if the count T in the count down timer has elapsed, the routine proceeds through the routine [T=T1] 24' to decision block [too-far?] 28 which checks the too-far flag. If the flag indicates that the scanned bar code pattern is too far, the new decode result is ignored, and the routine returns to [get scan] 12 to obtain another scan of bar code data. Otherwise, the routine proceeds to block done] 26 which indicates that the decoded bar scan is accepted as being both valid and not too far, and is accordingly counted.

By way of explanation and further elaboration, regarding the count down timer, if T is set as a value T1, T will decrease by one count in each unit time period until T=0. After a successful decode, and when a menu bar code is not indicated, T is always reset to a constant value T1. T1 can also be programmable, such as by a bar code menu bar code, but a default value for T1 (e.g., 800 ms) can also be implemented in software. If another decode result is obtained within the time period T1 which is exactly the same as the previous decode result, the second decode is ignored, and the timer is reset again (set T=T1 again).

By utilizing T, even if a bar code appears in the scanner's field of view for a relatively long period of time, no additional new decode results will be reported since the timer T is reset and reset again for each successful new decode.

In summary, during the decoding process a too-far flag is set in software if the symbol is sensed to be too far from the scanner by comparing the detected time width of bars and spaces with a preselected value char-len. In general, as a bar code is moved further from the scanner, the time widths of bars and spaces will decrease, and as a bar code is moved closer to the scanner, the time widths of bars and spaces will increase. By selecting different values of char-len, different working ranges can be obtained to fit different requirements and environments.

In the case wherein the symbol is located at a critical distance from the scanner, this condition is usually considered as being too far, and accordingly a new decode result will not be reported. If the symbol is moved closer to the scanner than in the critical decode case, the decode is usually stable and results in a successful decode. As soon as a successful decode is reported, no additional decodes are expected to be reported since a stable decode keeps resetting the time T.

Figure 2:
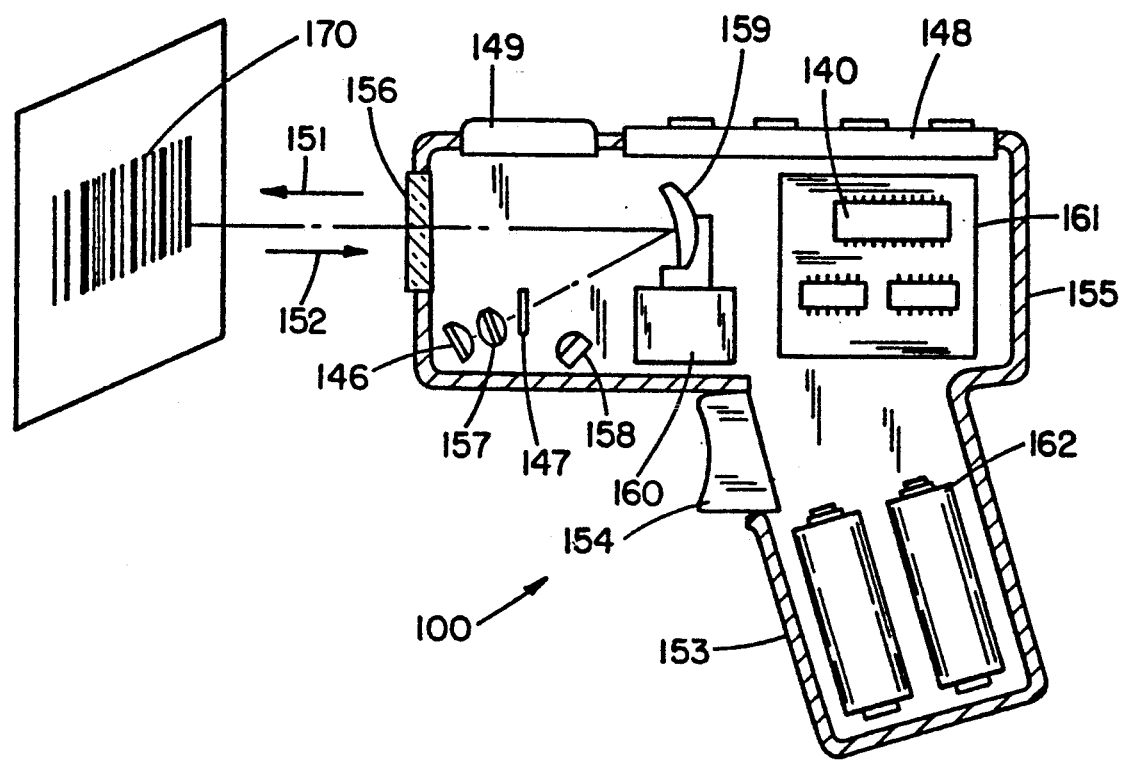
FIG. 2 illustrates a highly simplified embodiment of one type of bar code reader/scanner which can be utilized in association with the teachings of the present invention.

FIG. 2 illustrates a highly simplified embodiment of one type of prior art bar code reader and illustrates the essential components thereof. The reader 100 is illustrated as being implemented in a hand-held scanner, but could also be utilized in other arrangements, such as a check-out counter scanner, or as described herein. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 2 is generally of the style disclosed in U.S. Pat. No. 4,760,248 issued to Swartz et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al. or U.S. Pat. No. 4,409,470 issued to Shepard et al., both such patents assigned to Symbol Technologies, Inc., may be employed in constructing the bar code reader unit of FIG. 2. These U.S. Pat. Nos. 4,760,248, 4,896,026 and 4,409,470 are incorporated herein by reference, but the general design of such devices will be briefly described here for reference.

Referring to FIG. 2 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected and/or scattered light 152 from the symbol is detected by a light-responsive device 158 in the reader unit, producing serial electrical signals to be processed and decoded for reproducing the data represented by the bar code. As used hereinafter, the term "reflected light" shall mean reflected and/or scattered light.

In a preferred embodiment, the reader unit 100 is a gun-shaped device having a pistol-grip type of handle 153. A movable trigger 154 is employed to allow the user to activate the light beam 151 and detector circuitry when the user has positioned the device to point at the symbol to be read. A lightweight plastic housing 155 contains the laser light source 146, the detector 158, the optics 157, 147, 159, and signal processing circuitry including a CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operated in the range of perhaps several inches.

The reader 100 may also function as a portable computer terminal, and include a keyboard 148 and a display 149, such as described in the previously noted U.S. Pat. No. 4,409,470.

As further depicted in FIG. 2, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

Although the present invention has been described with respect to reading one or two dimensional bar codes, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably by used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control of data lines associated with such components may be connected to an electrical connector mounted on the edge or external surface of the module to enable the module to be electrically connected to a mating connector associated with other elements of a data acquisition system.

An individual module may have specific scanning or decoding characteristics associated therewith, e.g., operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

While a preferred embodiment and several variations of the present invention for a bar code decoder with changeable working ranges are described in detail herein, it should be apparent that the disclosure and teachings of the present invention will suggest many alternative designs to those skilled in the art.

What is claimed is:

1. A method of bar code decoding comprising:
   a. scanning a bar code symbol with a bar code scanner;
   b. converting the detected bar code symbol to digital data representing the detected widths of the bars and spaces of the scanned bar code symbol;
   c. first evaluating the digital data to determine if the detected widths of the bars and spaces of the scanned bar code symbol are too small, which indicates that the bar code symbol is too far and is beyond the working range of the bar code scanner, by comparing the detected widths of the bars and spaces of the scanned bar code symbol with a threshold value to determine if the detected widths of the bars and spaces of the scanned bar code symbol are greater than the threshold value;
   d. provisionally accepting the detected bars code symbol if the detected widths of the bars and spaces of the scanned bar code symbol are greater than the threshold value; and
   e. secondly evaluating the digital data to determine if the provisionally accepted bar code symbol is a valid bar code symbol, and ultimately accepting the detected bar code symbol as a bar code symbol to be reported if it passes both said first and second evaluating steps.

2. A method of bar code decoding as claimed in claim 1, further including the step of selecting said threshold value in dependence upon the requirements of the particular bar code scanning application.

3. A method of bar code decoding as claimed in claim 1, further including the step of changing said threshold value by scanning a bar code menu bar code which indicates a particular value for the threshold value.

4. A method of bar code decoding as claimed in claim 1, including performing said scanning step with a laser scanning beam.

5. A method of bar code decoding as claimed in claim 1, wherein said scanning step is performed by directing the laser beam against a rotating or oscillating scanning mirror.

6. A method of bar code decoding as claimed in claim 1, further comprising:
   a. storing in memory the digital data representing the detected widths of the bars and spaces of the scanned bar code symbol;
   b. after said scanning step, initializing the count in a count down timer to zero;
   c. if said second evaluating step indicates a valid bar code symbol, setting the count of the count down timer to a given value T1, in which if a second decode result is obtained which is identical to the prior decode result stored in memory, the second decode result is disregarded; and
   d. if said second evaluating step indicates a valid bar code symbol, checking the results of said first evaluating step to determine if the scanned bar code symbol is within the working range of the bar code scanner, and if so, accepting the scanned bar code symbol as a bar code symbol to be reported, and if not, repeating said scanning step.

7. A method of bar code decoding as claimed in claim 6, further including:
   a. if said second evaluating step indicates a valid bar code symbol, checking the scanned bar code symbol to determine if it is a menu bar code, and if so, changing said threshold value to a new threshold value indicated by said menu bar code and repeating said scanning step.

8. A method of bar code decoding as claimed in claim 1, further including:
   a. if said second evaluating step indicates a valid bar code symbol, checking the scanned bar code symbol to determine if it is a menu bar code, and if so, changing said threshold value to a new threshold value indicated by said menu bar code and repeating said scanning step.

9. A method of bar code decoding as claimed in claim 4, wherein said scanning step is performed by directing the laser beam against a rotating or oscillating scanning mirror.

10. A bar code decoder comprising:
    a. a bar code scanner for scanning a bar code symbol;
    b. means for converting the detected bar code symbol to digital data representing the detected widths of the bars and spaces of the scanned bar code symbol;
    c. first means for evaluating the digital data to determine if the detected widths of the bars and spaces of the scanned bar code symbol are too small, which indicates that the bar code symbol is too far and is beyond the working range of the scanner, by comparing the detected widths of the bars and spaces of the scanned bar code symbol with a threshold value to determine if the detected widths of the bars and spaces of the scanned bar code symbol are greater than the threshold value, wherein the detected bar code symbol is provisionally accepted and reported if said first evaluating means indicates that the detected widths of the bars and spaces of the scanned bar code symbol are greater than said threshold value; and
    d. second means for evaluating the digital data to determine if the provisionally accepted bar code symbol is a valid bar code symbol, and ultimately accepting the detected bar code symbol as a bar code symbol to be reported if said second evaluating means indicates the provisionally accepted bar code symbol is a valid bar code symbol.

11. A bar code decoder as claimed in claim 10, further including a bar code menu bar code for indicating a particular value for the threshold value, and wherein said threshold value is changed by the bar code scanner scanning the bar code menu bar code.

12. A bar code decoder as claimed in claim 10, further comprising:
    a. a memory means for storing the digital data representing the detected widths of the bars and spaces of the scanned bar code symbol;
    b. a count down timer, and wherein after said bar code scanner scans a bar code symbol, the count in the count down timer is initialized to zero;
    c. and wherein when said second evaluating means indicates a valid bar code symbol, the count of the count down timer is set to a given value T1, during which if a second decode result is obtained which is identical to the prior decode result stored in memory, the second decode result is disregarded;
    d. and wherein when said second evaluating means indicates a valid bar code symbol, the results of said first evaluating means is checked to determine if the scanned bar code symbol is within the working range of the bar code scanner, and if so, the scanned bar code symbol is accepted as a bar code symbol to be reported, and if not, said bar code scanner is activated to scan again.

13. A bar code decoder as claimed in claim 10, wherein:
   a. when said second evaluating means indicates a valid bar code symbol, the scanned bar code symbol is checked to determine if it is a menu bar code, and if so, said threshold value is changed to a new threshold value indicated by said menu bar code and said bar code scanner is activated to obtain another scan.

14. A bar code decoder as claimed in claim 10, wherein said bar code scanner includes a laser means for generating a laser scanning beam.

15. A bar code decoder as claimed in claim 14, wherein said bar code scanner includes an oscillating scanning mirror against which the laser beam is directed.

16. A method of bar code decoding comprising:
   a. scanning a bar code symbol with a bar code scanner;
   b. converting the detected bar code symbol to digital data representing the detected widths of the bars and spaces of the scanned bar code symbol;
   c. evaluating the digital data to determine if the detected widths of the bars and spaces of the scanned bar code symbol are too small, which indicates that the bar code symbol is too far and is beyond the working range of the bar code scanner by comparing the detected widths of the bars and spaces of the scanned bar code symbol with a threshold value selected prior to said scanning to determine if the detected widths of the bars and spaces of the scanned bar code symbol are greater than the threshold value; and
   d. accepting the detected bars code symbol if the detected widths of the bars and spaces of the scanned bar code symbol are greater than the threshold value.

17. A method of bar code decoding as claimed in claim 16, further including the step of selecting said threshold value in dependence upon requirements of a particular bar code scanning application.

18. A method of bar code decoding as claimed in claim 17, further including the step of changing said threshold value by scanning a bar code menu bar code which indicates a particular value for the threshold value.

19. A method of bar code decoding as claimed in claim 18, further including the step of secondly evaluating the digital data to determine if the detected bar code symbol is a valid bar code symbol, and accepting the detected bar code symbol as a bar code symbol to be reported if it passes both said evaluating step and said second evaluating step.

20. A method of bar code decoding as claimed in claim 19, further comprising:
   the steps of checking to determine if the accepted bar code symbol is a menu bar code, and if so, changing said threshold value to a new threshold value indicated by said menu bar code and repeating said scanning step.

21. A method of bar code decoding as claimed in claim 20, further comprising:
   a. storing in memory the digital data representing the detected widths of the bars and spaces of the scanned bar code symbol;
   b. after said scanning step, initializing the count in a count down timer to zero;
   c. if said second evaluating step indicates a valid bar code symbol, setting the count of the count down timer to a given value T1, in which if a second decode result is obtained which is identical to the prior decode result stored in memory, the second decode result is disregarded; and
   d. if said second evaluating step indicates a valid bar code symbol, checking the results of said evaluating step to determine if the scanned bar code symbol is within the working range of the bar code scanner, and if so, accepting the scanned bar code symbol as a bar code symbol to be reported, and if not, repeating said scanning step.

22. A method of bar code decoding as claimed in claim 20, wherein:
   a. said bars and spaces of the scanned symbol are in a sequence; and b. said second evaluating step is passed if the sequence of the widths of the bars and spaces conform to a methodology for an acceptable bar code symbol.

23. A bar code decoder comprising:
   a. a bar code scanner for scanning a bar code symbol;
   b. means for converting the detected bar code symbol to digital data representing the detected widths of the bars and spaces of the scanned bar code symbol;
   c. means for evaluating the digital data to determine if the detected widths of the bars and spaces of the scanned bar code symbol are too small, which indicates that the bar code symbol is too far and is beyond the working range of the scanner, by comparing the detected widths of the bars and spaces of the scanned bar code symbol with a threshold value selected prior to scanning to determine if the detected widths of the bars and spaces of the scanned bar code symbol are greater than the threshold value; and
   means for accepting and reporting the detected bar code symbol if said evaluating means indicates that the detected widths of the bars and spaces of the scanned bar code symbol are greater than said threshold value.

24. A bar code decoder as claimed in claim 23, further including a bar code menu bar code for indicating a particular value for the threshold value, and wherein said threshold value is changed by the bar code scanner scanning the bar code menu bar code.

25. A bar code decoder as claimed in claim 24, further including a second means for evaluating the digital data to determine if the detected bar code symbol is a valid bar code symbol, and wherein the detected bar code symbol is accepted as a bar code symbol to be reported if said second evaluating means indicates the bar code symbol is a valid bar code symbol.

26. A bar code decoder as claimed in claim 25, further comprising:
   means for checking to determine if the accepted bar code symbol is a menu bar code, and if so, changing said threshold value to a new threshold value indicated by said menu bar code and activating said bar code scanner is activated to obtain another scan.

27. A bar code decoder as claimed in claim 26, further comprising:
   a. a memory means for storing the digital data representing the detected widths of the bars and spaces of the scanned bar code symbol;

b. a count down timer, and wherein after said bar code scanner scans a bar code symbol, the count in the count down timer is initialized to zero;

c. and wherein when said second evaluating means indicates a valid bar code symbol, the count of the count down timer is set to a given value T1, during which if a second decode result is obtained which is identical to the prior decode result stored in memory, the second decode result is disregarded; and d. and wherein when said second evaluating means indicates a valid bar code symbol, the results of said evaluating means is checked to determine if the scanned bar code symbol is within the working range of the bar code scanner, and if so, the scanned bar code symbol is accepted as a bar code symbol to be reported, and if not, said bar code scanner is activated to scan again.

28. A bar code decoder as claimed in claim 26, wherein:

a. said bars and spaces of the scanned symbol are in a sequence; and b. said second means for evaluating indicates a valid bar code symbol if the sequence of the widths of the bars and spaces conform to a methodology for an acceptable bar code symbol.

29. A method of bar code decoding as claimed in claim 1, wherein:

a. said bars and spaces of the scanned symbol are in a sequence; and b. said second evaluating step is passed if the sequence of the widths of the bars and spaces conform to a methodology for an acceptable bar code symbol.

30. A bar code decoder as claimed in claim 10, wherein:

a. said bars and spaces of the scanned symbol are in a sequence; and b. said second means for evaluating indicates a valid bar code symbol if the sequence of the widths of the bars and spaces conform to a methodology for an acceptable bar code symbol.

* * * * *